United States Patent
Zhu

(10) Patent No.: US 10,183,641 B2
(45) Date of Patent: Jan. 22, 2019

(54) COLLISION PREDICTION AND FORWARD AIRBAG DEPLOYMENT SYSTEM FOR AUTONOMOUS DRIVING VEHICLES

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 0 days.

(21) Appl. No.: 15/467,096

(22) Filed: Mar. 23, 2017

(65) Prior Publication Data
US 2018/0272975 A1    Sep. 27, 2018

(51) Int. Cl.
| | |
|---|---|
| G05D 1/00 | (2006.01) |
| G08G 1/16 | (2006.01) |
| B60R 21/01 | (2006.01) |
| G06N 99/00 | (2010.01) |
| H04L 29/08 | (2006.01) |
| B60R 21/0134 | (2006.01) |

(52) U.S. Cl.
CPC ....... *B60R 21/0134* (2013.01); *G05D 1/0055* (2013.01); *G05D 1/0088* (2013.01); *G06N 99/005* (2013.01); *G08G 1/16* (2013.01); *H04L 67/12* (2013.01); *B60R 2021/01013* (2013.01); *B60R 2021/01211* (2013.01); *G05D 2201/0213* (2013.01)

(58) Field of Classification Search
CPC ....... B60R 21/0134; B60R 2021/01211; B60R 2021/01013; G05D 1/0055; G08G 1/16
See application file for complete search history.

(56) References Cited

U.S. PATENT DOCUMENTS

| | | | | |
|---|---|---|---|---|
| 8,095,276 | B2* | 1/2012 | Kozyreff | B60R 21/0134 701/45 |
| 8,260,538 | B2* | 9/2012 | Noda | B60T 7/22 340/435 |
| 8,781,720 | B2* | 7/2014 | Kindo | G08G 1/167 701/300 |
| 9,937,891 | B2* | 4/2018 | Ohno | B60R 21/272 |
| 2007/0112516 | A1* | 5/2007 | Taniguchi | B60R 21/0134 701/301 |
| 2014/0292557 | A1* | 10/2014 | Ajala | B60R 21/0134 342/107 |
| 2015/0066323 | A1* | 3/2015 | Ouchi | B60T 7/22 701/70 |

* cited by examiner

*Primary Examiner* — Michael J Zanelli
(74) *Attorney, Agent, or Firm* — Womble Bond Dickinson (US) LLP

(57) ABSTRACT

In one embodiment, perception data is received perceiving a driving environment surrounding an ADV, including an object in front of the ADV. In response the perception data, a collision detection system determines a relative speed and distance between the ADV and the object based on the perception data. The collision detection system determines whether a collision between the ADV and the object is avoidable in view of the physical driving limitation associated with the ADV. The physical driving limitation may include a maximum braking capability or a maximum deceleration rate that can be applied to the ADV. If it is determined that such a collision is unavoidable, an airbag is deployed prior to the collision between the ADV and the object.

21 Claims, 7 Drawing Sheets

COLLISION PREDICTION AND FORWARD AIRBAG DEPLOYMENT SYSTEM FOR AUTONOMOUS DRIVING VEHICLES

TECHNICAL FIELD

Embodiments of the present invention relate generally to operating autonomous vehicles. More particularly, embodiments of the invention relate to airbag deployment method for autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. In traditional vehicles, a collision is detected based on an impact resulted from the collision (e.g., after the collision), and an airbag is deployed in hundreds of milliseconds after the collision happens. Such a delay of airbag deployment may not prevent the driver and passengers from being injured.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
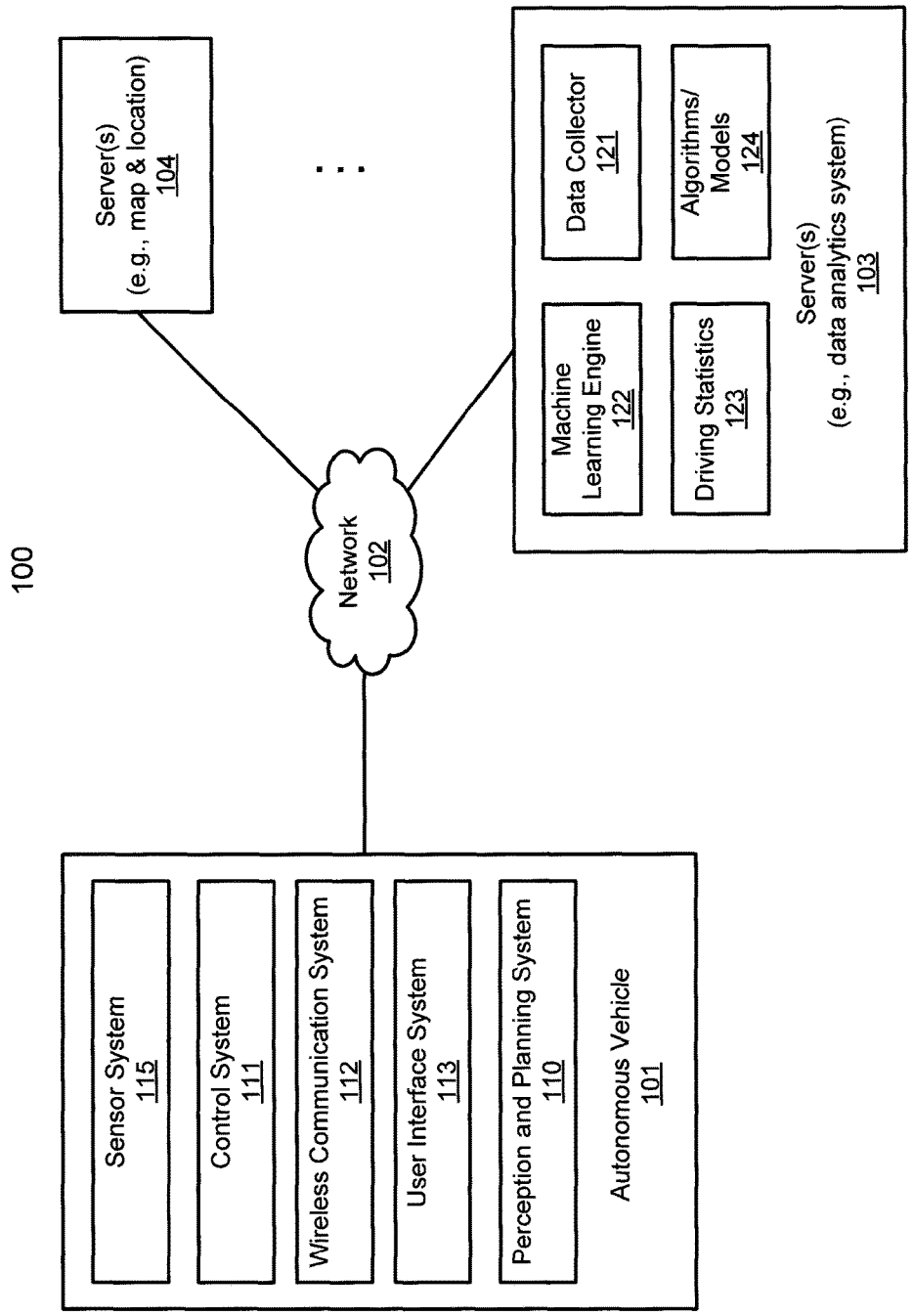
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a collision detection system is utilized in an autonomous driving vehicle (ADV) to detect a collision that will inevitably happen and to deploy an airbag prior to the actual collision as a preemptive action to reduce the possibility of injuries to the passengers riding in the ADV. Specifically, the collision detection system detects that the ADV is moving approaching an object (e.g., another vehicle, an obstacle) in front of the ADV. The collision system determines whether a collision can be avoided given the physical driving limitations (e.g., maximum braking capability) of the ADV. If it is determined that the collision is unavoidable, the collision detection system deploys an airbag of the ADV prior to the possible collision between the ADV and the object in front of the ADV. As a result, the potential injuries to the passengers of the ADV may be prevented.

In one embodiment, perception data is received perceiving a driving environment surrounding an ADV, including perceiving an object in front of the ADV. In response the perception data, a collision detection system determines a relative speed and distance between the ADV and the object based on the perception data. The collision detection system determines whether a collision between the ADV and the object is avoidable in view of the physical driving limitation associated with the ADV. The physical driving limitation may include a maximum braking capability or a maximum deceleration rate that can be generated and applied to the ADV. If it is determined that such a collision is unavoidable, an airbag is deployed prior to the collision between the ADV and the object.

In one embodiment, in determining whether a collision is avoidable, the system determines a deceleration rate that is required for the ADV to decelerate in order to avoid colliding with the object based on the current speed of the ADV and the distance between the ADV and the object. The required deceleration rate is compared with a maximum deceleration rate that can be generated for the ADV given the physical driving limitation of the ADV. The collision is unavoidable if the required deceleration rate is greater than the maximum deceleration rate of the ADV that can be generated. In other words, if the ADV cannot slow down quick enough before colliding with the object given the maximum deceleration rate in view of the current speed of the ADV and the distance between the ADV and the object, the collision is unavoidable.

According to another embodiment, in determining whether a collision is avoidable, the system calculates the time it takes for the ADV to collide with the object if the current speed of the ADV is maintained. The system further calculates the time it takes for the ADV to collide with the object if the maximum deceleration rate is applied. If the difference between the time it takes to collide with the object if no action is taken and the time it takes to collide with the object if the maximum deceleration rate is applied is less than a predetermined threshold, the collision is deemed to be unavoidable. Note that the object can be another vehicle moving in front of the ADV. The above process can also be applicable based on the relative speed of the ADV and the other vehicle, as well as their relative distance in between.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
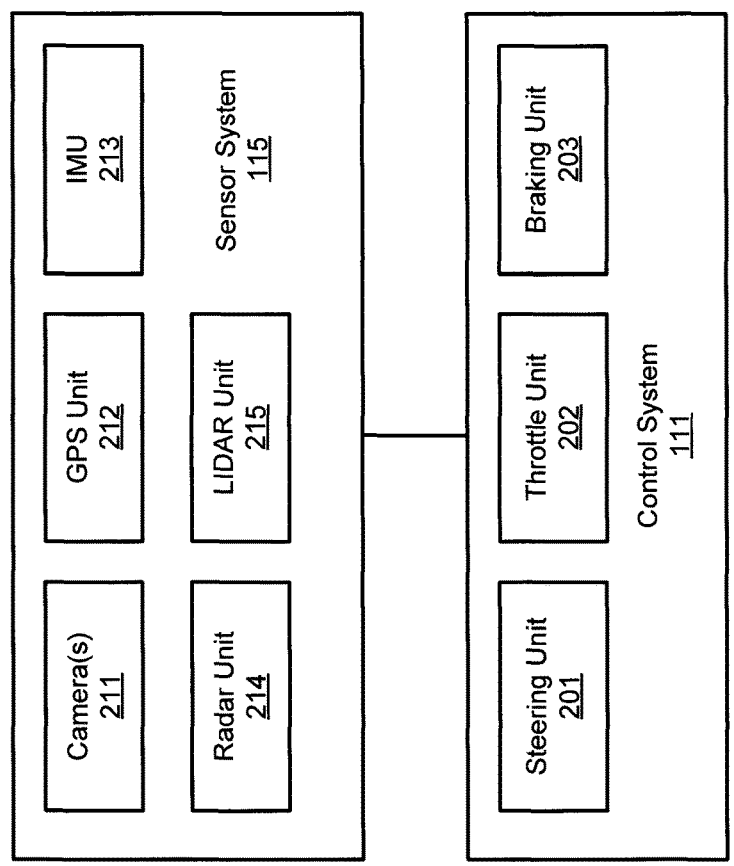
FIG. 2 is a block diagram illustrating an example of an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 performs or trains a set of rules, algorithms, and/or predictive models 124 for a variety of purposes. For example, rules 124 may include a rule specifying if the deceleration rate required for an ADV to decelerate or stop is avoid colliding an object is greater than a maximum deceleration rate that can be generated based on the physical driving limitation of the ADV, the collision is unavoidable. Rules 124 may further include a time threshold between first time the ADV takes to collide with an object given the current speed of the ADV and the distance between the ADV and the object and second time the ADV takes to collide with the object if the maximum deceleration rate is applied. Rules 124 may specify that if the time difference between the first time and the second time is less than the time threshold, the collision is unavoidable. Rules 124 may be then uploaded onto the ADVs to be utilized to detect the unavoidable collision in real-time.

Figure 3:
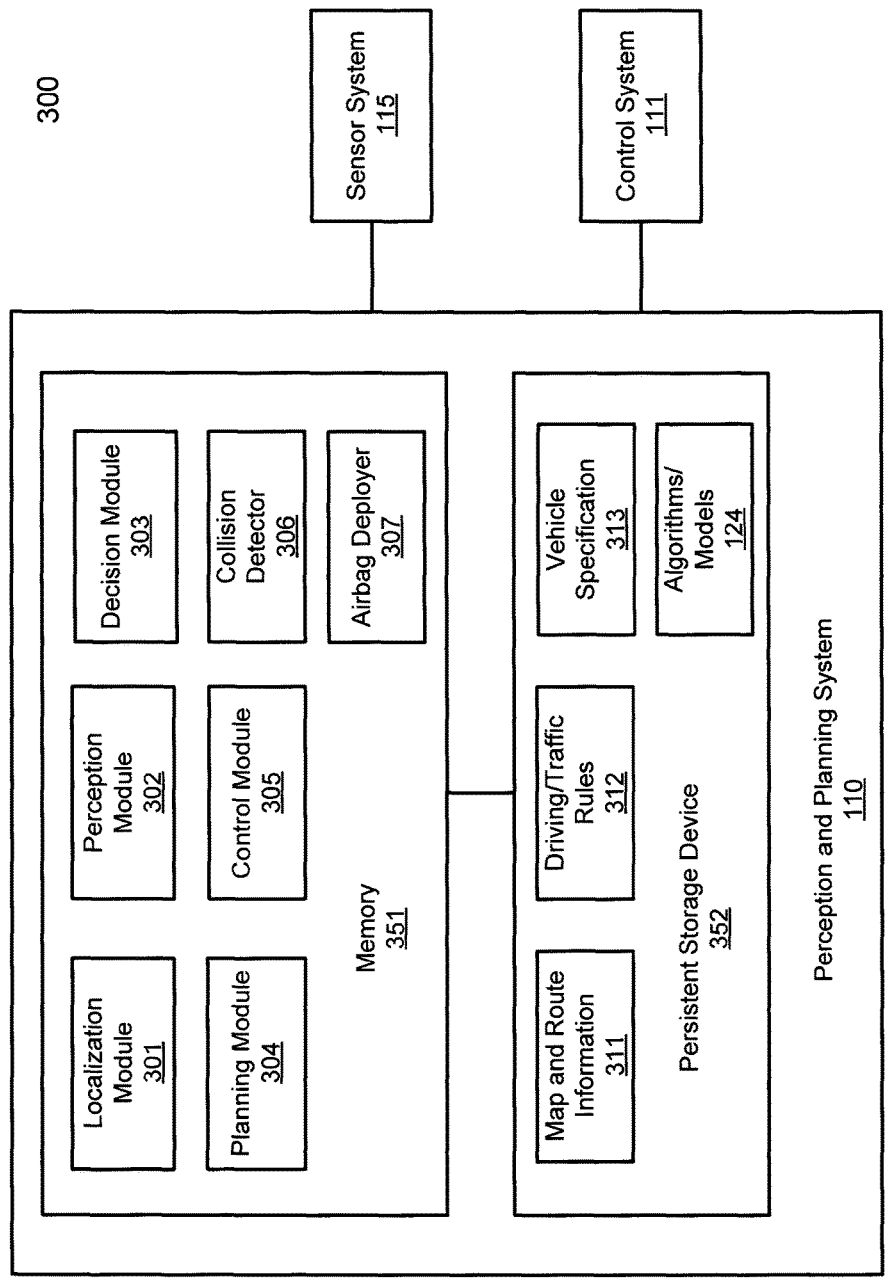
FIG. 3 is a block diagram illustrating an example of a perception and planning system used with an autonomous vehicle according to one embodiment of the invention.

FIG. 3 is a block diagram illustrating an example of a perception and planning system used with an autonomous vehicle according to one embodiment of the invention. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, decision module 303, planning module 304, control module 305, collision detector 306, and airbag deployer 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules or driving rules 312, which may be stored in persistent storage device 352.

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Collision detector 306 may be implemented as part of the collision avoidance system as described above. In one embodiment, collision detector 306 is configured to detect whether a potential collision between the ADV and an object is avoidable given the physical driving limitation or specification of the ADV under the circumstances. If it is determined that the potential collision is unavoidable, airbag deployer 307 is configured to deploy an airbag prior to the collision.

Figure 4:
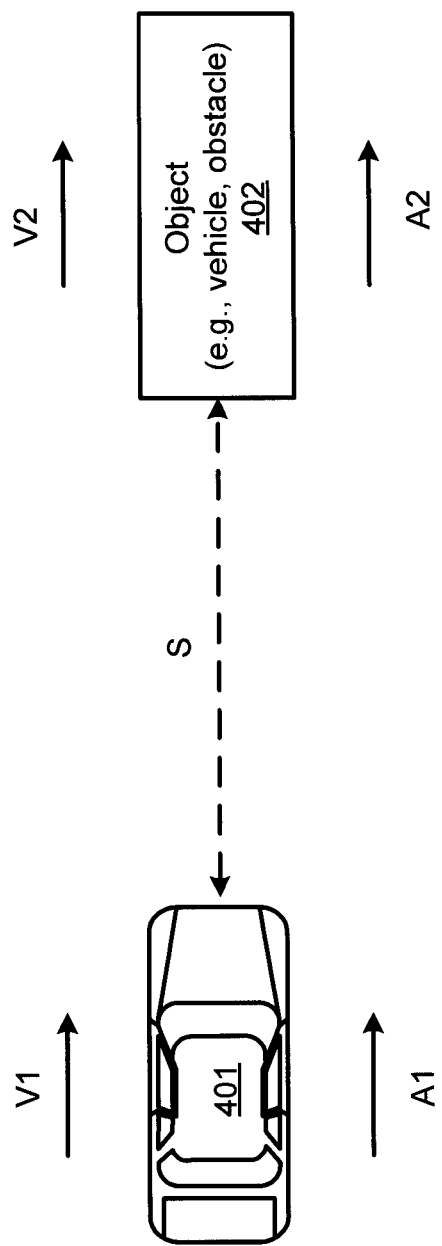
FIG. 4 is a block diagram illustrating relative positions between an autonomous driving vehicle and an object.
Figure 5:
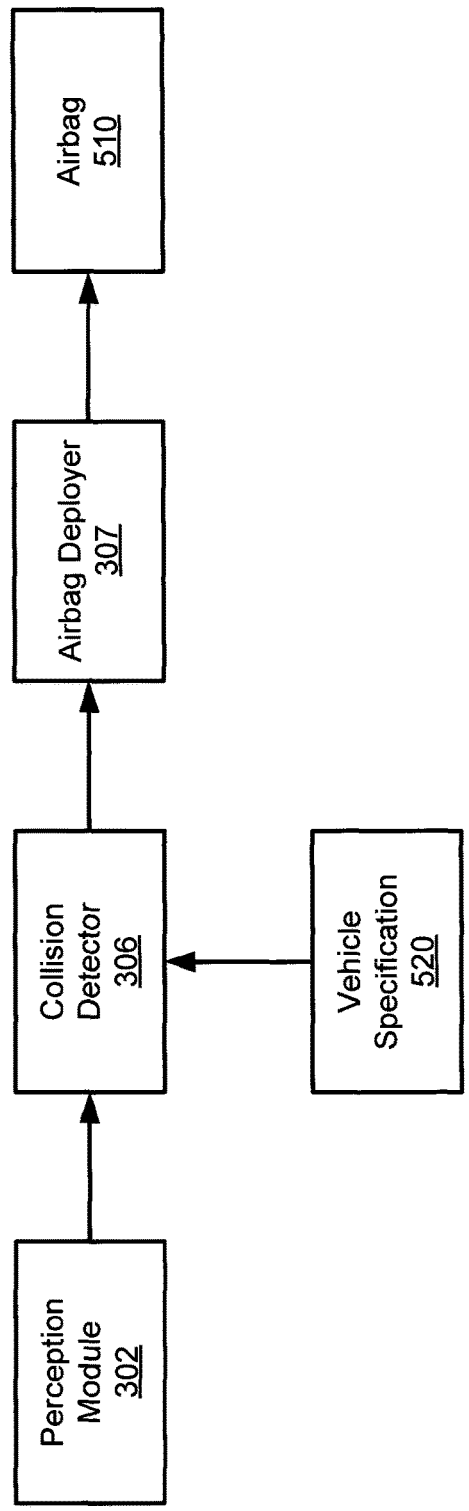
FIG. 5 is a diagram illustrating a processing flow of detecting collision and deploying an airbag according to one embodiment of the invention.

According to one embodiment, referring now to FIGS. 3 and 4, collision detector 306 receives perception data from perception module 302. The perception data describes and perceives a driving environment surrounding ADV 401, including object 402 that is positioned in front of ADV 401 or occupying at least a portion of a driving lane of ADV 401. In response to the perception data, collision detector 306 determines a relative speed and distance between the ADV 401 and object 402 based on the perception data. The relative speed and distance between ADV 401 and object 402 may be measured based on sensor data obtained from a variety of sensors as described above, such as, for example, GPS sensors, radars, LIDAR, etc.

The object 402 may be a moving object such as another vehicle or a fixed obstacle (e.g., a building, a street sign, etc.). The collision detector 306 determines whether a collision between the ADV 401 and the object 402 is avoidable in view of the physical driving limitation associated with the ADV, which may be a part of vehicle specification 520. The physical driving limitation may include a maximum braking capability or a maximum deceleration rate that can be applied to the ADV, which may be represented by the maximum braking percentage. If it is determined that such a collision is unavoidable, collision detector 306 sends an airbag deployment signal to airbag deployer 307 to deploy airbag 510 prior to the collision between the ADV 401 and the object 402.

In one embodiment, in determining whether a collision is avoidable, collision detector 306 determines a deceleration rate that is required for ADV 401 to decelerate to avoid colliding with object 402 based on the current speed of the ADV 401 and the distance between the ADV 401 and the object 402. The required deceleration rate is compared with a maximum deceleration rate that can be generated for the ADV given the physical driving limitation of the ADV, which may be obtained from vehicle specification 520. Vehicle specification 520 may be stored as part of rules 124. The collision is unavoidable if the required deceleration rate is greater than the maximum deceleration rate of the ADV 401 that can be generated. In other words, if the ADV 401 cannot slow down quick enough before colliding with the object 402 given the maximum deceleration rate in view of the current speed of the ADV 401 and the distance between the ADV 401 and the object 402, the collision is unavoidable.

According to another embodiment, in determining whether a collision is avoidable, the collision detector 306 calculates the time it takes for ADV 401 to collide with object 402 if the current speed of ADV 401 is maintained (e.g., no additional action taken). Collision detector 306 further calculates the time it takes for ADV 401 to collide with object 402 if the maximum deceleration rate is applied to ADV 401. Collision detector 306 calculates the difference between the time ADV 401 takes to collide with object 402 if no action is performed and the time ADV 401 takes to collide with object 402 if the maximum deceleration rate is applied. If the difference is less than a predetermined threshold, the collision is deemed to be unavoidable.

Note that object 402 can be a moving object such as another vehicle moving in front of ADV 401. The above process can also be applicable based on the relative speed of ADV 401 and the other vehicle, as well as their relative distance (S) in between. According to one embodiment, a first speed of ADV 401 is measured and a second speed of vehicle 402 is also measured, for example, using a variety of sensors as described above. Collision detector 306 calculates first time (T1) ADV 401 would take to collide with vehicle 402 if the first speed (V1) of ADV 401 and the second speed (V2) of vehicle 402 remain unchanged. Collision detector 306 further calculates second time T2 ADV 401 would takes to collide with vehicle 402 if the maximum deceleration rate is applied to ADV 401. If the difference between the first time T1 and the second time T2 is less than a predetermined threshold, the collision is deemed to be unavoidable.

According to another embodiment, collision detector 306 calculates the second time T2 ADV 401 takes to collide with vehicle 402 if the maximum acceleration rate (A2) is also applied to vehicle 402, while the maximum deceleration rate (A1) is applied to ADV 401. Collision detector 306 may recognize the type of vehicle 402 based on the perception data perceiving vehicle 402. Based on the recognized type of vehicle 402, the maximum acceleration rate can be estimated. In one embodiment, collision detector 306 may perform a lookup operation in a data structure or table mapping the vehicle types to their corresponding maximum acceleration rates, which may be maintained as part of vehicle specification 520. The mapping data structure may include a number of mapping entries, where each entry maps a particular vehicle type to a maximum acceleration rate.

If there is no action is taken, time T1 can be derived based on the following equation: S=|V1−V2|*T1. If the maximum acceleration A2 is applied to vehicle 402 and maximum deceleration A1 is applied to ADV 401, the speed of ADV 401 at the time of the collision would be V1−A1*T2. The speed of vehicle 402 at the time of the collision would be V2+A2*T2. The initial speed difference $V_{diff}1$ between the speed of ADV 401 and the speed of vehicle 402 is |V1−V2|. The speed difference between the speed of ADV 401 and the speed of vehicle 402 at the time of collision is |(V1−A1*T2)−(V2+A2*T2)|. The average speed $V_{avg}$ between ADV 401 and vehicle 402 over time period T2 can be determined as follows:

$$V_{avg}=\{(V1-V2)+[(V1-A1*T2)-(V2+A2*T2)]\}/2$$

Since $S=V_{avg}*T2$, T2 can be derived from the following equation:

$$S=T2*\{(V1-V2)+[(V1-A1*T2)-(V2+A2*T2)]\}/2$$

For example, it is assumed that the current speed V1 of ADV 401 is 30 meters per second (mps) and the current speed V2 of vehicle 402 is 10 mps. It is assumed that the distance S between ADV 401 and vehicle 402 is 4 meters at the point in time. Thus, if the current speeds V1 and V2 of ADV 401 and vehicle 402 remain unchanged, the time from now to the impact of the collision can be derived: T1=4/(30−10)=0.2 seconds. Thus, if no action is taken, it takes approximately 0.2 seconds for ADV 401 to collide with vehicle 402.

It is assumed the maximum deceleration rate A1 for ADV 401 is 5 meters per square second (m/s²) and the maximum acceleration rate A2 of vehicle 402 is 3 m/s². The initial or current speed difference |V1−V2| is (30−10)=20 mps. The speed difference between ADV 401 and vehicle 402 when the impact happens is (30−T2)−(10+3*T2)=20−8T2. The average speed $V_{avg}$ until the impact is (20+20−8*T2)/2. Therefore, time T2 can be derived from the following equation:

$$(20+(20-8*T2))/2*T2=4$$

From the above equation, T2 can be derived as approximately 0.22 seconds.

Thus, if the maximum deceleration rate A1 is applied to ADV 401 and the maximum acceleration rate A2 is applied to vehicle 402, it takes 0.22 seconds for the collision to happen. The difference in time (T2−T1) between the scenario in which no action is taken and the scenario in which maximum acceleration and deceleration rates are applied to vehicle 402 and ADV 401 respectively is approximately 0.02 seconds. If such difference is less than a predetermined threshold, the collision is deemed to be unavoidable. The predetermined threshold may be determined or configured offline by a data analytics system (e.g., data analytics system 103) based on a large amount of driving statistics.

Figure 6:
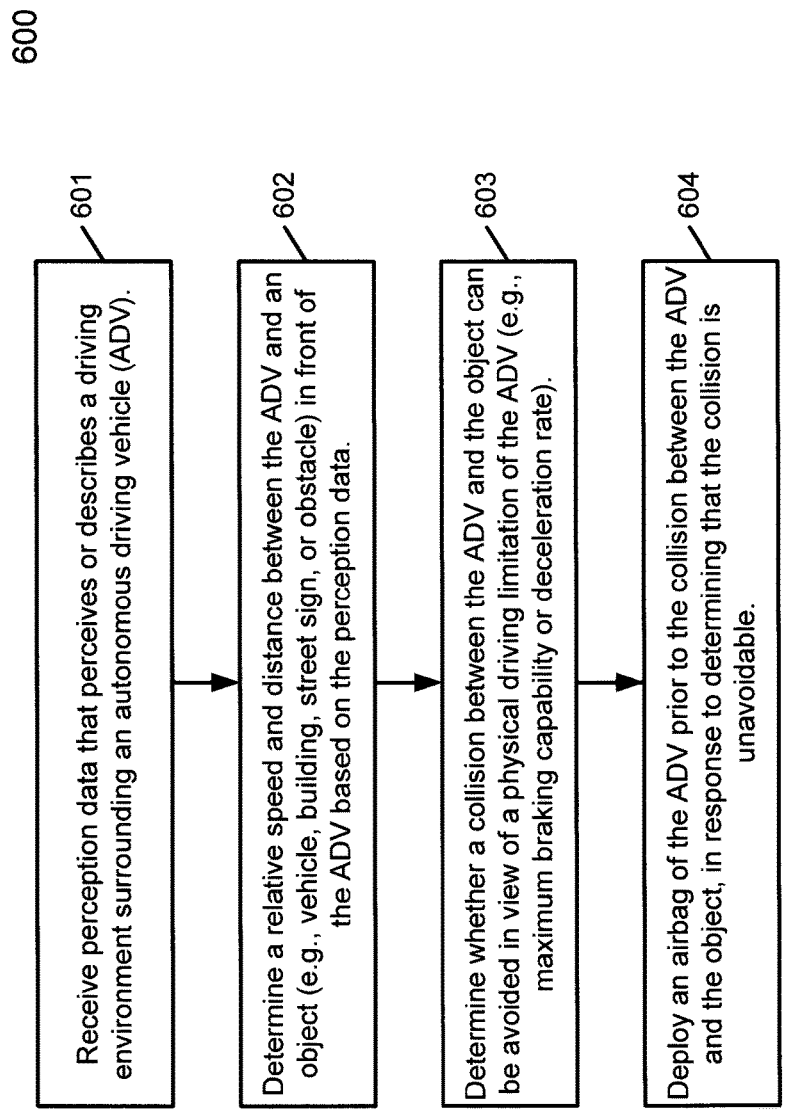
FIG. 6 is a flow diagram illustrating a process of operating an autonomous driving vehicle according to one embodiment of the invention.

FIG. 6 is a flow diagram illustrating a process of operating an autonomous driving vehicle according to one embodiment of the invention. Process 600 may be performed by processing logic which may include software, hardware, or a combination thereof. For example, process 600 may be performed by collision detector 306 and/or airbag deployer 307. Referring to FIG. 6, in operation 601, processing logic receives perception data perceiving a driving environment surrounding an ADV. The perception data may be received from a perception module, which may be generated based on sensor data collected from a variety of sensors as described above. The perception data perceives an object that is positioned in front of the ADV or occupying at least a portion of the driving space in the driving lane in which the ADV is moving.

In operation 602, processing logic determines a relative speed and distance between the ADV and the object based on the perception data. The object can be a moving object such as another vehicle or a fixed obstacle (e.g., a building, a road block, and a street sign), etc. In operation 603, processing logic determines whether a collision between the ADV and the object can be avoidable in view of the physical driving limitations of the ADV and the object if the object is another vehicle. The physical driving limitations of the ADV may be the maximum deceleration rate that the ADV can generate. The physical driving limitation of the other vehicle represented by the object can be the maximum acceleration rate that can be generated from the vehicle. If it is determined that the collision is unavoidable, in operation 604, an airbag is deployed prior to the collision.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
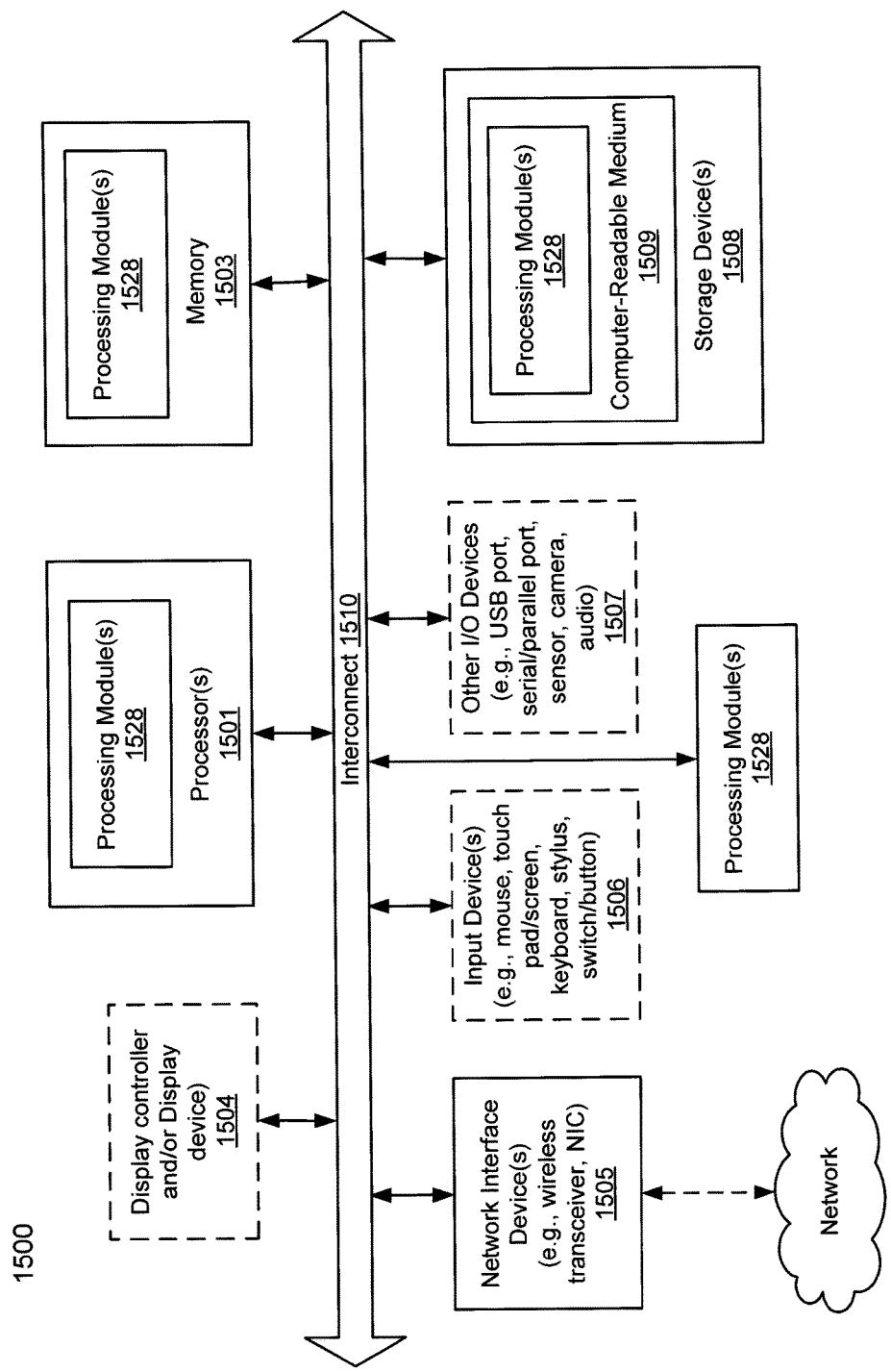
FIG. 7 is a block diagram illustrating a data processing system according to one embodiment.

FIG. 7 is a block diagram illustrating an example of a data processing system which may be used with one embodiment of the invention. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, perception module 302, planning module 304, control module 305, collision detector 306, and/or airbag deployer 307. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for operating an autonomous driving vehicle, the method comprising:
   receiving perception data perceiving a driving environment surrounding an autonomous driving vehicle (ADV), including perceiving an object in front of the ADV;
   determining a relative speed and distance between the object and ADV based on the perception data;
   determining whether a collision between the ADV and the object is unavoidable based on the relative speed and distance between the object and the ADV, in view of a first physical driving limitation associated with the ADV and a second physical driving limitation associated with the object; and
   deploying an airbag equipped with the ADV prior to the collision with the object, in response to determining that the collision is unavoidable.

2. The method of claim 1, wherein determining whether a collision between the ADV and the object is unavoidable comprises:
   determining a deceleration rate that is required for the ADV to avoid colliding with the object based on a first speed of the ADV and the distance between the ADV and the object; and
   comparing the required deceleration rate with a maximum deceleration rate that can be generated for the ADV given the first physical driving limitation of the ADV, wherein the collision is unavoidable if the required deceleration rate is greater than the maximum deceleration rate of the ADV.

3. The method of claim 2, wherein the collision is unavoidable if the ADV cannot slow down enough or fully stop before colliding with the object given the maximum deceleration rate in view of the first speed of the ADV and the distance between the ADV and the object.

4. A computer-implemented method for operating an autonomous driving vehicle, the method comprising:
    receiving perception data perceiving a driving environment surrounding an autonomous driving vehicle (ADV), including perceiving an object in front of the ADV;
    determining a relative speed and distance between the object and ADV based on the perception data;
    determining whether a collision between the ADV and the object is unavoidable based on the relative speed and distance between the object and the ADV, in view of a first physical driving limitation associated with the ADV, including
        calculating a first time the ADV takes to collide with the object if a first speed of the ADV representing a current speed of the ADV is maintained,
        calculating a second time the ADV takes to collide with the object if a maximum deceleration rate is applied to the ADV in view of the first physical driving limitation of the ADV, and
        comparing a difference between the first time and the second time, wherein if the difference between the first time and the second time is less than a predetermined threshold, the collision is deemed to be unavoidable; and
    deploying an airbag equipped with the ADV prior to the collision with the object, in response to determining that the collision is unavoidable.

5. The method of claim 4, further comprising:
    recognizing that the object is a first vehicle moving in front of the ADV based on the perception data;
    measuring a second speed representing a current speed of the first vehicle; and
    calculating the first time the ADV takes to collide with the first vehicle if the second speed of the first vehicle is also maintained.

6. The method of claim 4, further comprising:
    recognizing that the object is a first vehicle moving in front of the ADV based on the perception data;
    estimating a maximum acceleration rate in view of a second physical driving limitation associated with a type of the first vehicle; and
    calculating the second time the ADV takes to collide with the first vehicle if the maximum acceleration rate is further applied to the first vehicle.

7. The method of claim 6, further comprising:
    calculating a first speed difference between the first speed of the ADV and the second speed of the first vehicle;
    calculating a second speed difference between a third speed of the ADV and a fourth speed of the first vehicle when the maximum deceleration rate and the maximum acceleration rate are applied; and
    calculating an averaged speed difference between the first speed difference and the second speed difference, wherein the second time is determined based on the averaged speed difference in view of the distance between the ADV and the first vehicle.

8. A non-transitory machine-readable medium having instructions stored therein, which when executed by a processor, cause the processor to perform operations, the operations comprising:
    receiving perception data perceiving a driving environment surrounding an autonomous driving vehicle (ADV), including perceiving an object in front of the ADV;
    determining a relative speed and distance between the object and ADV based on the perception data;
    determining whether a collision between the ADV and the object is unavoidable based on the relative speed and distance between the object and the ADV, in view of a first physical driving limitation associated with the ADV and a second physical driving limitation associated with the object; and
    deploying an airbag equipped with the ADV prior to the collision with the object, in response to determining that the collision is unavoidable.

9. The machine-readable medium of claim 8, wherein determining whether a collision between the ADV and the object is unavoidable comprises:
    determining a deceleration rate that is required for the ADV to avoid colliding with the object based on a first speed of the ADV and the distance between the ADV and the object; and
    comparing the required deceleration rate with a maximum deceleration rate that can be generated for the ADV given the first physical driving limitation of the ADV, wherein the collision is unavoidable if the required deceleration rate is greater than the maximum deceleration rate of the ADV.

10. The machine-readable medium of claim 9, wherein the collision is unavoidable if the ADV cannot slow down enough or fully stop before colliding with the object given the maximum deceleration rate in view of the first speed of the ADV and the distance between the ADV and the object.

11. A non-transitory machine-readable medium having instructions stored therein, which when executed by a processor, cause the processor to perform operations, the operations comprising:
    receiving perception data perceiving a driving environment surrounding an autonomous driving vehicle (ADV), including perceiving an object in front of the ADV;
    determining a relative speed and distance between the object and ADV based on the perception data;
    determining whether a collision between the ADV and the object is unavoidable based on the relative speed and distance between the object and the ADV, in view of a first physical driving limitation associated with the ADV, including
        calculating a first time the ADV takes to collide with the object if a first speed of the ADV representing a current speed of the ADV is maintained,
        calculating a second time the ADV takes to collide with the object if a maximum deceleration rate is applied to the ADV in view of the first physical driving limitation of the ADV, and
        comparing a difference between the first time and the second time, wherein if the difference between the first time and the second time is less than a predetermined threshold, the collision is deemed to be unavoidable; and
    deploying an airbag equipped with the ADV prior to the collision with the object, in response to determining that the collision is unavoidable.

12. The machine-readable medium of claim 11, wherein the operations further comprise:
  recognizing that the object is a first vehicle moving in front of the ADV based on the perception data;
  measuring a second speed representing a current speed of the first vehicle; and
  calculating the first time the ADV takes to collide with the first vehicle if the second speed of the first vehicle is also maintained.

13. The machine-readable medium of claim 11, wherein the operations further comprise:
  recognizing that the object is a first vehicle moving in front of the ADV based on the perception data;
  estimating a maximum acceleration rate in view of a second physical driving limitation associated with a type of the first vehicle; and
  calculating the second time the ADV takes to collide with the first vehicle if the maximum acceleration rate is further applied to the first vehicle.

14. The machine-readable medium of claim 13, wherein the operations further comprise:
  calculating a first speed difference between the first speed of the ADV and the second speed of the first vehicle;
  calculating a second speed difference between a third speed of the ADV and a fourth speed of the first vehicle when the maximum deceleration rate and the maximum acceleration rate are applied; and
  calculating an averaged speed difference between the first speed difference and the second speed difference, wherein the second time is determined based on the averaged speed difference in view of the distance between the ADV and the first vehicle.

15. A data processing system, comprising:
  a processor; and
  a memory coupled to the processor to store instructions, which when executed by the processor, cause the processor to perform operations, the operations including
    receiving perception data perceiving a driving environment surrounding an autonomous driving vehicle (ADV), including perceiving an object in front of the ADV,
    determining a relative speed and distance between the object and ADV based on the perception data,
    determining whether a collision between the ADV and the object is unavoidable based on the relative speed and distance between the object and the ADV, in view of a first physical driving limitation associated with the ADV and a second physical driving limitation associated with the object, and
    deploying an airbag equipped with the ADV prior to the collision with the object, in response to determining that the collision is unavoidable.

16. The system of claim 15, wherein determining whether a collision between the ADV and the object is unavoidable comprises:
  determining a deceleration rate that is required for the ADV to avoid colliding with the object based on a first speed of the ADV and the distance between the ADV and the object; and
  comparing the required deceleration rate with a maximum deceleration rate that can be generated for the ADV given the first physical driving limitation of the ADV, wherein the collision is unavoidable if the required deceleration rate is greater than the maximum deceleration rate of the ADV.

17. The system of claim 16, wherein the collision is unavoidable if the ADV cannot slow down enough or fully stop before colliding with the object given the maximum deceleration rate in view of the first speed of the ADV and the distance between the ADV and the object.

18. The system of claim 15, wherein determining whether a collision between the ADV and the object is unavoidable comprises:
  calculating first time the ADV takes to collide with the object if a first speed of the ADV representing a current speed of the ADV is maintained;
  calculating second time the ADV takes to collide with the object if a maximum deceleration rate is applied to the ADV in view of the first physical driving limitation of the ADV; and
  comparing a difference between the first time and the second time, wherein if the difference between the first time and the second time is less than a predetermined threshold, the collision is deemed to be unavoidable.

19. The system of claim 18, wherein the operations further comprise:
  recognizing that the object is a first vehicle moving in front of the ADV based on the perception data;
  measuring a second speed representing a current speed of the first vehicle; and
  calculating the first time the ADV takes to collide with the first vehicle if the second speed of the first vehicle is also maintained.

20. The system of claim 18, wherein the operations further comprise:
  recognizing that the object is a first vehicle moving in front of the ADV based on the perception data;
  estimating a maximum acceleration rate in view of a second physical driving limitation associated with a type of the first vehicle; and
  calculating the second time the ADV takes to collide with the first vehicle if the maximum acceleration rate is further applied to the first vehicle.

21. The system of claim 20, wherein the operations further comprise:
  calculating a first speed difference between the first speed of the ADV and the second speed of the first vehicle;
  calculating a second speed difference between a third speed of the ADV and a fourth speed of the first vehicle when the maximum deceleration rate and the maximum acceleration rate are applied; and
  calculating an averaged speed difference between the first speed difference and the second speed difference, wherein the second time is determined based on the averaged speed difference in view of the distance between the ADV and the first vehicle.

* * * * *